United States Patent
Jankura et al.

(10) Patent No.: US 8,696,007 B2
(45) Date of Patent: Apr. 15, 2014

(54) BICYCLE FRAME

(75) Inventors: Robb H. Jankura, Los Gatos, CA (US);
Brandon D. Sloan, Morgan Hill, CA (US); David Allen, Soquel, CA (US); Jeffrey D. Juarez, Santa Cruz, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/404,438

(22) Filed: Feb. 24, 2012

(65) Prior Publication Data
US 2013/0221633 A1    Aug. 29, 2013

(51) Int. Cl.
*B62J 9/02*    (2006.01)

(52) U.S. Cl.
USPC ............... 280/281.1; 280/274; 280/288.4

(58) Field of Classification Search
USPC .................. 280/281.1, 274, 288.4
See application file for complete search history.

(56) References Cited

U.S. PATENT DOCUMENTS

| | | | |
|---|---|---|---|
| 582,279 A | 5/1897 | Gold | |
| 2,415,735 A * | 2/1947 | Fastborg | 280/272 |
| 3,492,031 A * | 1/1970 | Henning | 74/502.4 |
| 4,102,219 A * | 7/1978 | Plamper | 74/502 |
| 4,887,827 A * | 12/1989 | Heggie | 280/272 |
| 5,478,100 A * | 12/1995 | McDermitt et al. | 280/281.1 |
| 5,749,590 A | 5/1998 | Roerig | |
| 6,003,890 A | 12/1999 | Inouye | |
| 6,581,492 B1 | 6/2003 | Chen | |
| 6,799,772 B2 | 10/2004 | Kettler et al. | |
| 8,100,425 B2 * | 1/2012 | Raynor | 280/269 |
| 2001/0040353 A1 | 11/2001 | Campagnolo | |
| 2004/0188976 A1* | 9/2004 | Schmider | 280/279 |
| 2006/0254381 A1* | 11/2006 | Chamberlain | 74/502.4 |
| 2012/0261896 A1* | 10/2012 | Callahan et al. | 280/282 |
| 2012/0261897 A1* | 10/2012 | Cote et al. | 280/288.4 |

FOREIGN PATENT DOCUMENTS

WO    2010091730    8/2010

* cited by examiner

*Primary Examiner* — Joseph M Rocca
*Assistant Examiner* — Marlon Arce
(74) *Attorney, Agent, or Firm* — Michael Best & Friedrich LLP

(57) ABSTRACT

A frame for a bicycle that has a fork and a handlebar. The frame includes a head tube, a bottom bracket adapted to support a crankset, and a down tube coupled between the head tube and the bottom bracket. The frame also has a fork bumper that is coupled to and is disposed on an underside of the down tube. The fork bumper extends outward from the down tube and includes a base and a resilient outer layer engageable by the fork to prevent contact between the down tube and the fork.

20 Claims, 9 Drawing Sheets

US 8,696,007 B2

BICYCLE FRAME

BACKGROUND

The present invention relates generally to bicycles, and more specifically to bicycle frames.

Bicycles commonly have a main frame and a front fork pivotally secured to the main frame. The main frame typically includes a top tube, a down tube, a seat tube, and a rear wheel mount for receiving a rear wheel axle. The front fork typically includes a front wheel mount for receiving a front wheel axle, and steering control of the bicycle is provided by a handlebar that is usually secured to the front fork via a handlebar stem.

On some bicycles, the front fork can hit the down tube when the handlebars are rotated too far in one direction (e.g., during crashes). When this happens, the shifters or brakes on the handlebar often hit the frame, which can scratch the paint, cause the frame to crack, and break the shifters or brakes.

SUMMARY

The present invention provides a frame for a bicycle that has a fork and a handlebar. The frame includes a head tube, a bottom bracket adapted to support a crankset, and a down tube coupled between the head tube and the bottom bracket. The frame also has a fork bumper that is coupled to and extends outward from an underside of the down tube. In one aspect of the invention, the fork bumper includes a base and a resilient outer layer engageable by the fork to prevent contact between the down tube and the fork.

In another aspect, the handlebar supports an actuator that is coupled to one of a drivetrain and a brake by a cable. The fork bumper is coupled to and disposed on an underside of the down tube and is engageable by the fork to prevent contact between the down tube and the fork. The fork bumper defines a passageway and the cable extends through the fork bumper within the passageway.

In yet another aspect, the fork bumper has a first side that is engageable by the fork in response to the fork pivoting in a first direction, and a second side that is engageable by the fork in response to the fork pivoting in a second direction different from the first direction. The fork bumper is oriented on the down tube such that the first and second sides converge toward each other adjacent the head tube.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
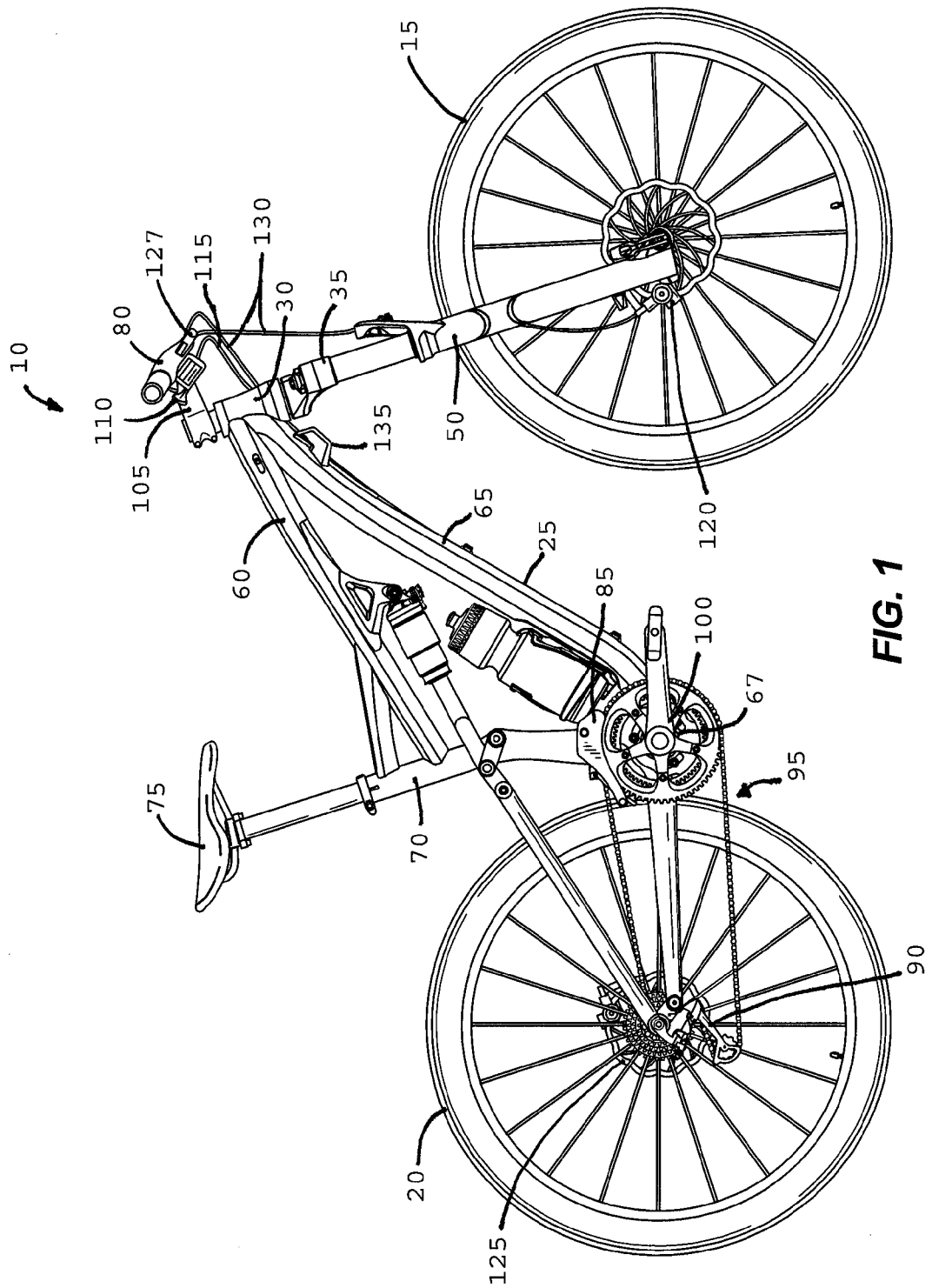
FIG. 1 is a side view of a bicycle having a frame embodying the present invention.
Figure 2:
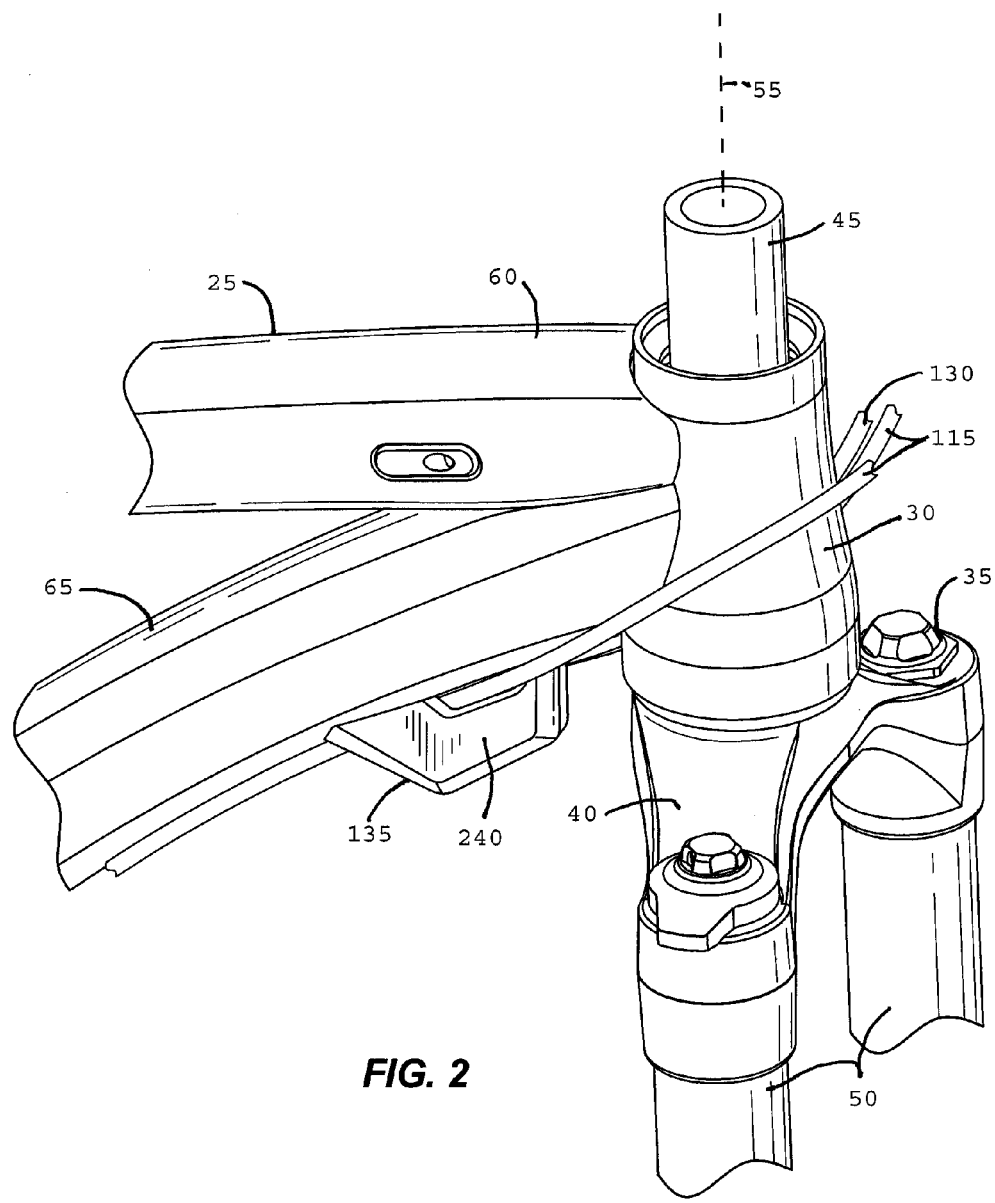
FIG. 2 is a perspective view of a portion of the frame of the bicycle illustrated in FIG. 1, including a top tube, a down tube, a fork, and a fork bumper.

FIG. 1 shows a bicycle 10 that includes a front wheel 15, a rear wheel 20, and a frame 25. The rear wheel 20 defines a central plane 27 of the bicycle 10. The frame 25 has a head tube 30 and a front fork 35 rotationally supported by the head tube 30. With reference to FIGS. 1 and 2, the fork 35 includes a crown 40, a steerer tube 45 that extends upward from the crown 40 into and through the head tube 30, and two legs 50 that extend downward from the crown 40 to secure the front wheel 15 to the frame 10. The head tube 30 defines a fork pivot axis 55 about which the steerer tube 45 pivots clockwise or counter-clockwise within the head tube 30, causing corresponding movement of the front wheel 15.

The frame 25 also has a top tube 60 connected to and extending rearward from the head tube 30, and a down tube 65 connected to the head tube 30 below the top tube 60 and extending generally downward toward a bottom bracket 67 of the frame 25. A seat tube 70 extends upward from the bottom bracket and is connected to the top tube 60, and a seat 75 is supported by the seat tube 70. The illustrated down tube 65 is coupled to the head tube 30 and to the bottom bracket, and extends in a generally downward and rearward direction from the head tube 30 to the bottom bracket.

The bicycle 10 also includes a handlebar 80, a front derailleur 85, a rear derailleur 90, and a drivetrain 95 including a crankset 100 supported by the bottom bracket 67. The handlebar 80 is secured to the front fork 35 by a stem 105 such that movement of the handlebar 80 results in movement of the stem 105 and the fork 35. The front derailleur 85 and the rear derailleur 90 are connected to respective shift actuators 110 (e.g., shift levers) located on the handlebar 80 by shift cables 115 that are routed along the down tube of the frame 25. Also, a front brake 120 and a rear brake 125 are connected to respective brake actuators 127 (e.g., brake levers) located on the handlebar 80 by brake cables 130. The brake cable 130 associated with the rear brake 125 is routed along the down tube 65 to one of the brake actuator 127 on the handlebar 80.

With reference to FIGS. 1-5 and 7, the bicycle 10 also includes a fork bumper 135 mounted on the underside of the down tube 65 near the head tube 30. As shown, the fork bumper 135 extends outward from the down tube 65 to prevent contact between the down tube 65 and the fork 35 when the handlebar 80 is pivoted a significant distance clockwise (to the right) or counter-clockwise (to the left).

Figure 5:
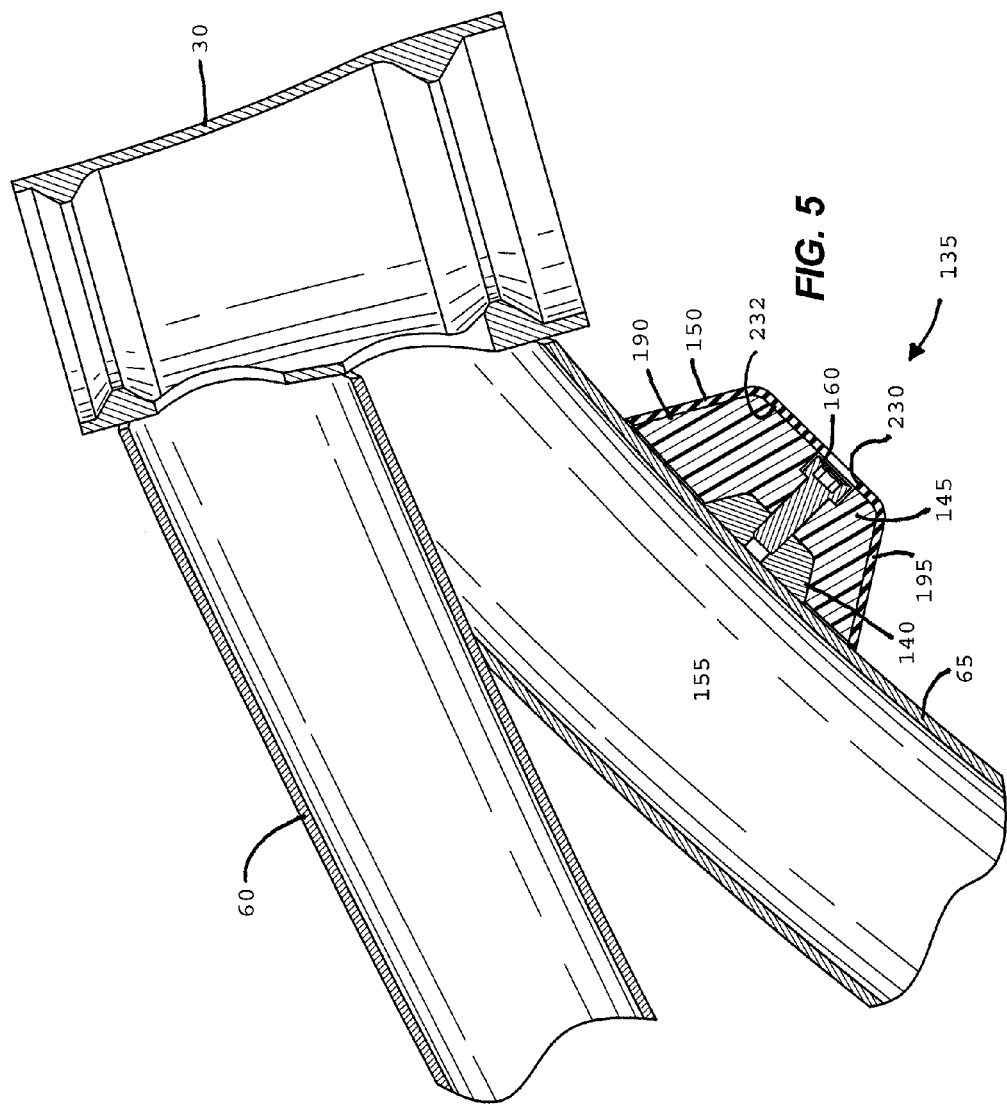
FIG. 5 is a cross-section of the frame taken along line 5-5 in FIG. 4.
Figure 6:
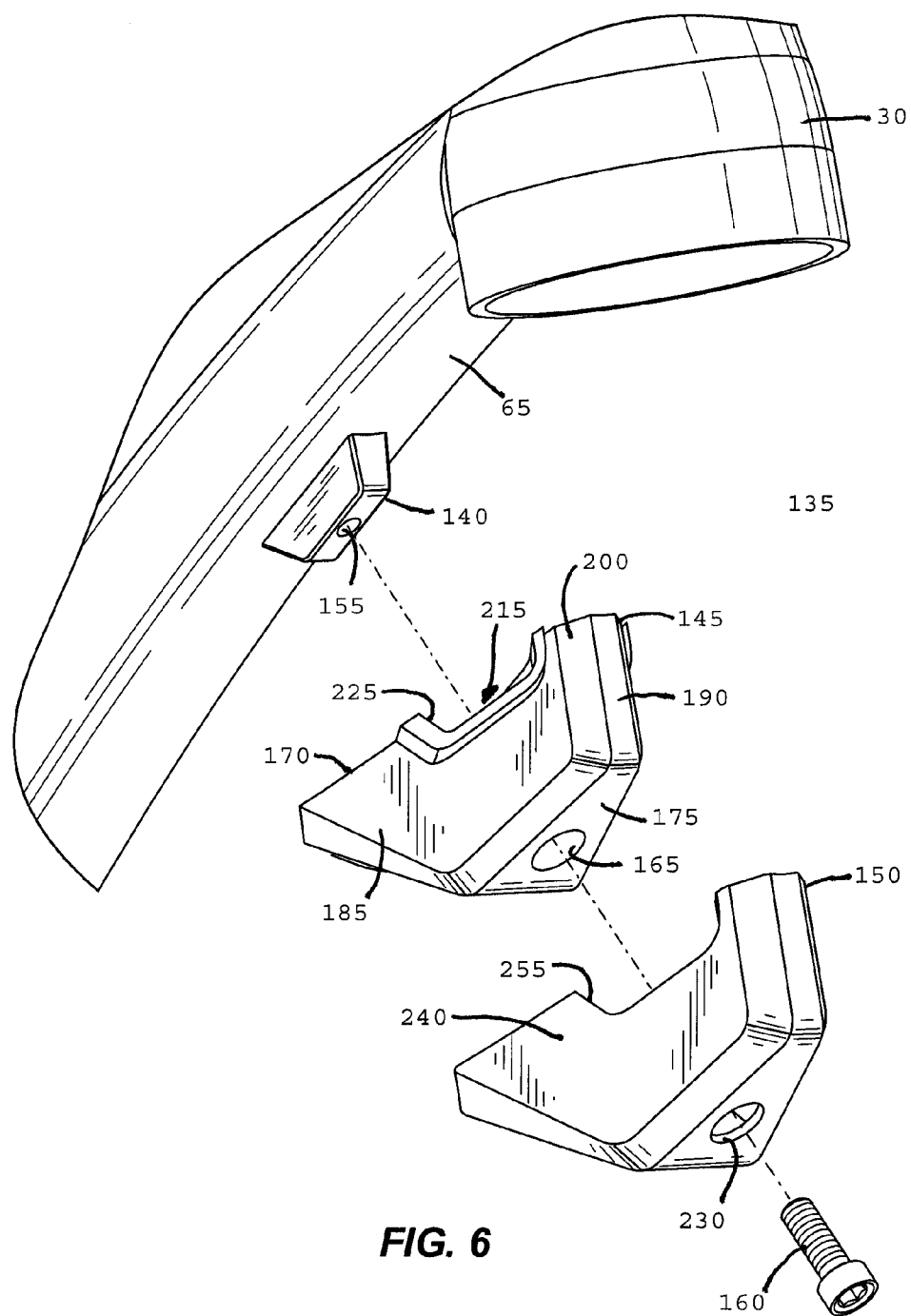
FIG. 6 is an exploded view of the frame and the fork bumper.
Figure 7:
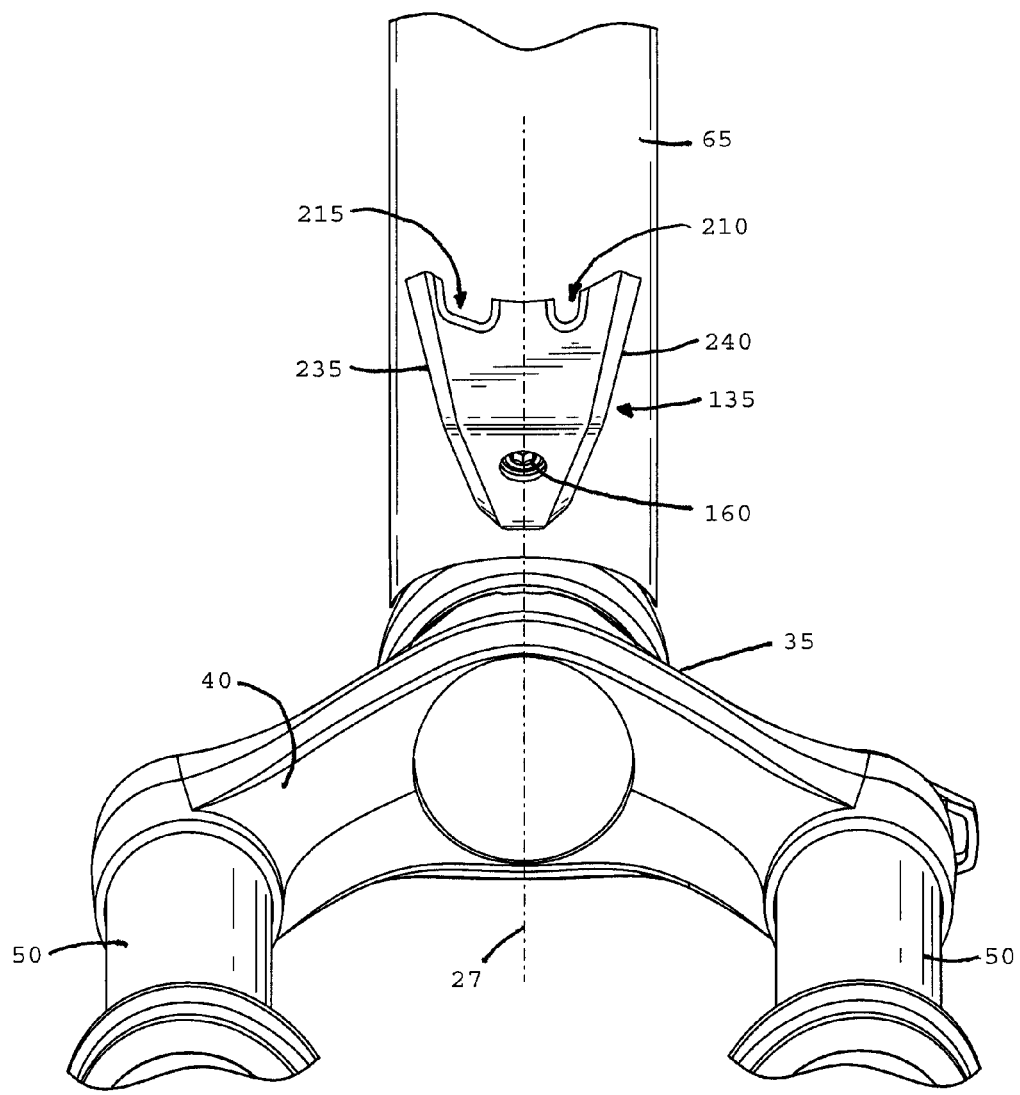
FIG. 7 is an underside view of the frame illustrating the fork in a non-rotated position.

The illustrated fork bumper 135 includes a rigid attachment member 140, a base 145, and a housing or outer layer 150 surrounding the base 145. The attachment member 140 is secured to the down tube 65 (e.g., welded or formed integrally with the down tube) and acts as an anchor or post that supports the base 145 and the housing 150. With reference to FIGS. 5 and 6, the attachment member 140 has a substantially rectangular or trapezoidal profile and includes a threaded hole 155 that receives a fastener 160 extending through the base 145 and the housing 150. The fastener 160 threads into the hole 155 to removably attach the base 145 and the housing 150 to the down tube 65. The attachment member 140 can have any suitable shape and any suitable attachment mechanism (e.g., tabs, slots, etc.) to secure the base 145 and the housing 150 to the down tube 65.

As illustrated, the base 145 is secured against the frame 25 by the fastener 160, which extends through a hole 165 in the base 145. The base 145 is formed from a relatively hard material (e.g., plastic, composite, metal, etc.). The illustrated base 145 is substantially solid, although the base 145 can be hollow.

Figure 3:
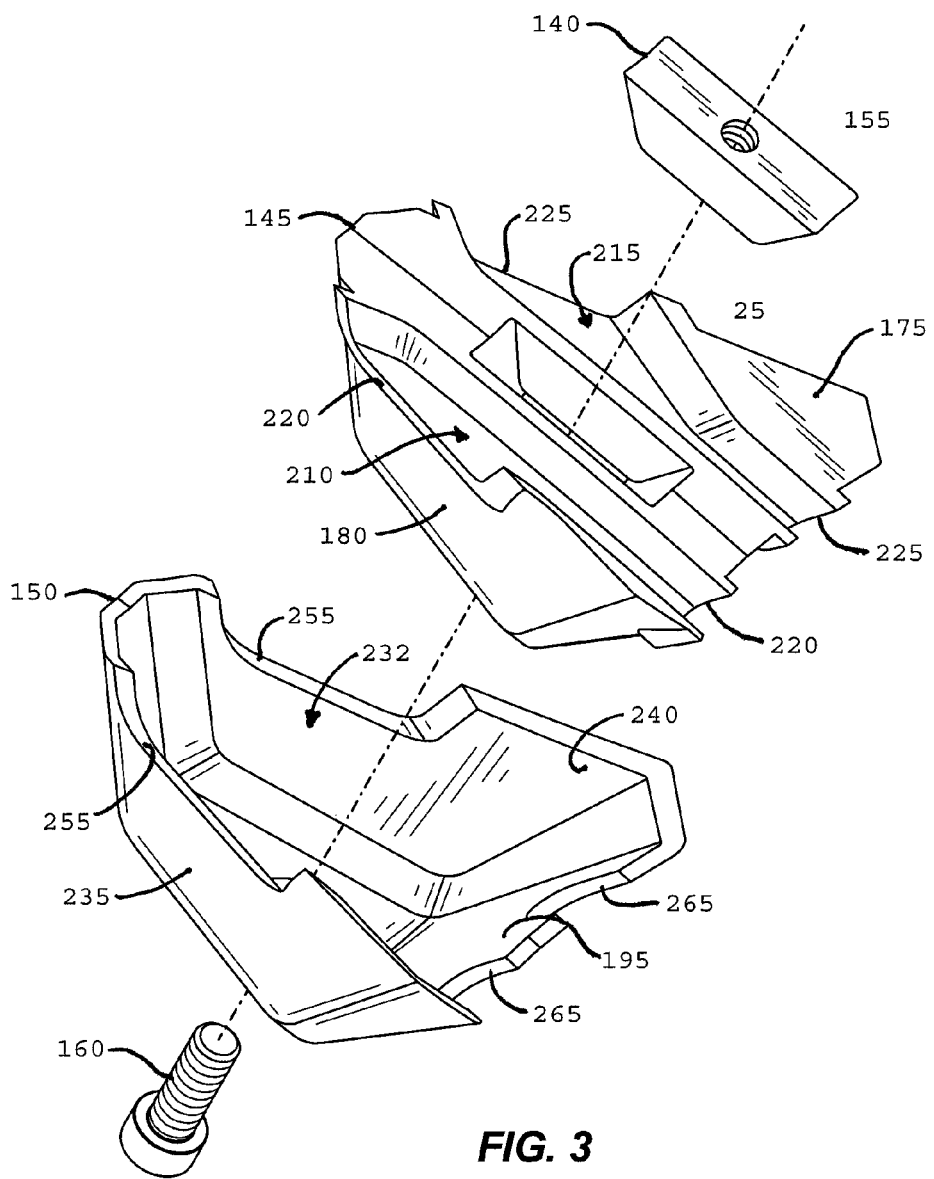
FIG. 3 is an exploded view of the fork bumper.

With reference to FIGS. 3, 5, and 6, the base 145 has a truncated pyramidal-shaped body with a relatively wide base end 170 (i.e., the end abutting the down tube 65 when the fork bumper 135 is attached to the bicycle 10). When viewed from the side (e.g., as mounted on the bicycle 10), the base 50 is substantially trapezoidal in cross-section. The base end 170 is shaped to conform to the shape of the exterior surface of the down tube 65.

The pyramidal-shaped base 145 has a base surface or wall 175, a first side surface or wall 180 that is connected to the base wall 175, and a second side surface or wall 185 that is connected to the base wall 175 opposite the first side wall 180. As illustrated, each of the base wall 175 and the first and second side walls 180, 185 is defined by a planar exterior surface. The base 145 also has a relatively narrow forward surface or wall 190 and a relatively wide rear surface or wall 195 that cooperate with the base wall 175 and the first and second side walls 180, 185 to define the overall shape of the base 145. The forward wall 190 is located nearest the head tube 30 and the rear wall 195 is located farthest from the head tube 30 when the fork bumper 135 is attached to the down tube. As shown in FIG. 5, the forward and rear walls 190, 195 approximately equal in length and define an interior angle A that is approximately 120° relative to the base wall 175. Due to the downwardly-extending down tube 65, the forward wall 190 is oriented nearly vertical and the rear wall 195 is nearly horizontal. With reference to FIG. 6, the base 145 has tapered surfaces or walls 200 between the base wall 175 and the first and second side walls 180, 185, and between the side walls 180, 185 and the forward and rear walls 190, 195.

When the fork bumper 135 is attached to the down tube 65 (FIG. 7), the second side wall 185 is symmetrically opposite the first side wall 180 about the central plane 27. Also, each of the first and second side walls 180, 185 converge toward each other adjacent the head tube 30 (i.e., toward the forward wall 190) such that the base 50 is substantially triangular in cross-section when viewed from underneath the down tube 65.

Referring to FIGS. 2-4, and 6, the base 145 also includes a pocket 205, a first recess or passageway 210, and a second recess or passageway 215 disposed in the base end 170. As illustrated, the pocket 205 is centrally located in the base end 170 and is shaped so that the attachment member 140 can be completely nested in or encapsulated by the base 145.

The first and second passageways 210, 215 extend longitudinally through the base 145 to assist with routing the cables 115, 130 from the handlebar 80 through the fork bumper 135. The first passageway 220 has an access opening 220 in the first side wall 180 near the forward wall 190 and another access opening 220 the rear wall 195. Similarly, the second passageway 215 has an access opening 225 in the second side wall 185 near the forward wall 190 and another access opening 225 in the rear wall 195. Due to the angle of the first and second side walls 180, 185, relative to the central plane 27, the access openings 220, 225 in the side walls 180, 185 are relatively wide and the access openings 220, 225 in the rear wall 195 are relatively narrow. The size of the access openings 220, 225 can be modified as needed to support the cables 115, 130 on the bicycle 10 within the fork bumper 135.

The down tube 65 encloses the first and second passageways 210, 215 when the fork bumper 135 is attached to the frame 25. The illustrated second passageway 215 is wider than the first passageway 210 to accommodate more than one cable 115, 130, although the passageways 210, 215 can be the same size. Generally, the passageways 210, 215 and the corresponding access openings 220, 225 are sized based on the quantity of cables 115, 130 being supported by the fork bumper 135. In some cases, the first and second passageways 210, 215 can merge within the body of the base 145 such that the passageways 210, 215 have respective access openings 220, 225 near the forward wall 190 and a common access opening in the rear wall 195. Alternatively, the fork bumper 135 can be provided with a single passageway to accommodate all of the cables 115, 130.

As illustrated in FIGS. 3-7, the housing 150 has a truncated pyramidal-shaped hollow body that substantially matches the shape of the base 145. FIGS. 3, 5, and 6 show that the housing 150 encapsulates the base 145 such that the base 145 is nested in the housing 150. Stated another way, the housing 150 defines a cup-like shell that has a cavity 232, and the base 145 is disposed in the cavity 232 when the fork bumper 135 is assembled so that the base 145 is substantially hidden from view by the housing 150. As illustrated, the cavity 232 has an interior profile that is shaped to conform to the truncated pyramidal-shaped base 145 so that the base 145 is form fit into the housing 150.

The housing 150 is formed from resilient material (e.g., rubber, composite, soft plastic, etc.) that surrounds the base 145 to absorb impact forces from the fork 35. Generally, the material forming the resilient housing 150 is softer (deflects under less force) than the material forming the base 145 to prevent damage to the fork 35 and down tube 65 caused by impact of the fork 35 on the fork bumper 135. The harder base 145 provides rigidity and strength to the fork bumper 135 to prevent the fork bumper 135 from being knocked off in response to impact forces from the fork 35. The illustrated housing 150 can be adhered to or co-molded with the base 145 such that engagement of the fastener 160 with the base 145 also holds the housing 150 in engagement with the down tube 65. In other words, the illustrated housing 150 is held in engagement with the down tube 65 indirectly by the fastener 160, which is accessible through a hole 230 in the housing 150 and is directly engaged with the base 145. Generally, the base 145 and the housing 150 can be attached to each other using any suitable fastening means (e.g., tabs and slots, etc.), or simply by nesting the base 145 in the housing 150 without any fastening element.

The housing 150 forms a resilient layer around the base 145 such that the exterior profile of the housing 150 is similar to the exterior profile of the base 145. In particular, the housing has a first planar side surface or wall 235 and a second planar side surface or wall 240 that define respective exterior sides of the fork bumper 135 and that are engageable by the fork 35. The first and second side walls 235, 240 converge toward each other near the head tube 30. As illustrated in FIGS. 4, 7, 9, and 10, the side walls 235, 240 are angled relative to and symmetrical about the central plane 27. The converging first and second side walls 235, 240 define respective first and second planes 245, 250 that intersect at or substantially at the fork pivot axis 55 to ensure that any contact by the fork 35 on the fork bumper 135 will occur substantially perpendicular to the first side wall 235 or the second side wall 240 (depending on the direction that the fork 35 is pivoted). In other words, the converging first and second side walls 235, 240 cooperate with the fork 35 to minimize sliding between the contact surfaces on the fork 35 and the fork bumper 135.

As shown in FIG. 3, each of the side walls 235, 240 has an elongated recess 255 that aligns with a corresponding access opening 220, 225 in the base 145 to accommodate the cables 115, 130. The housing 150 also has a rear wall 260 with recesses 265 that align with the access openings 220, 225 in the rear wall 195 of the base 145 to accommodate another portion of the cables 115, 130. The recesses 255, 265 are generally sized based on the size of the corresponding access openings 220, 225, although the rear wall 260 can have a single recess or more than two recesses.

Figure 8:
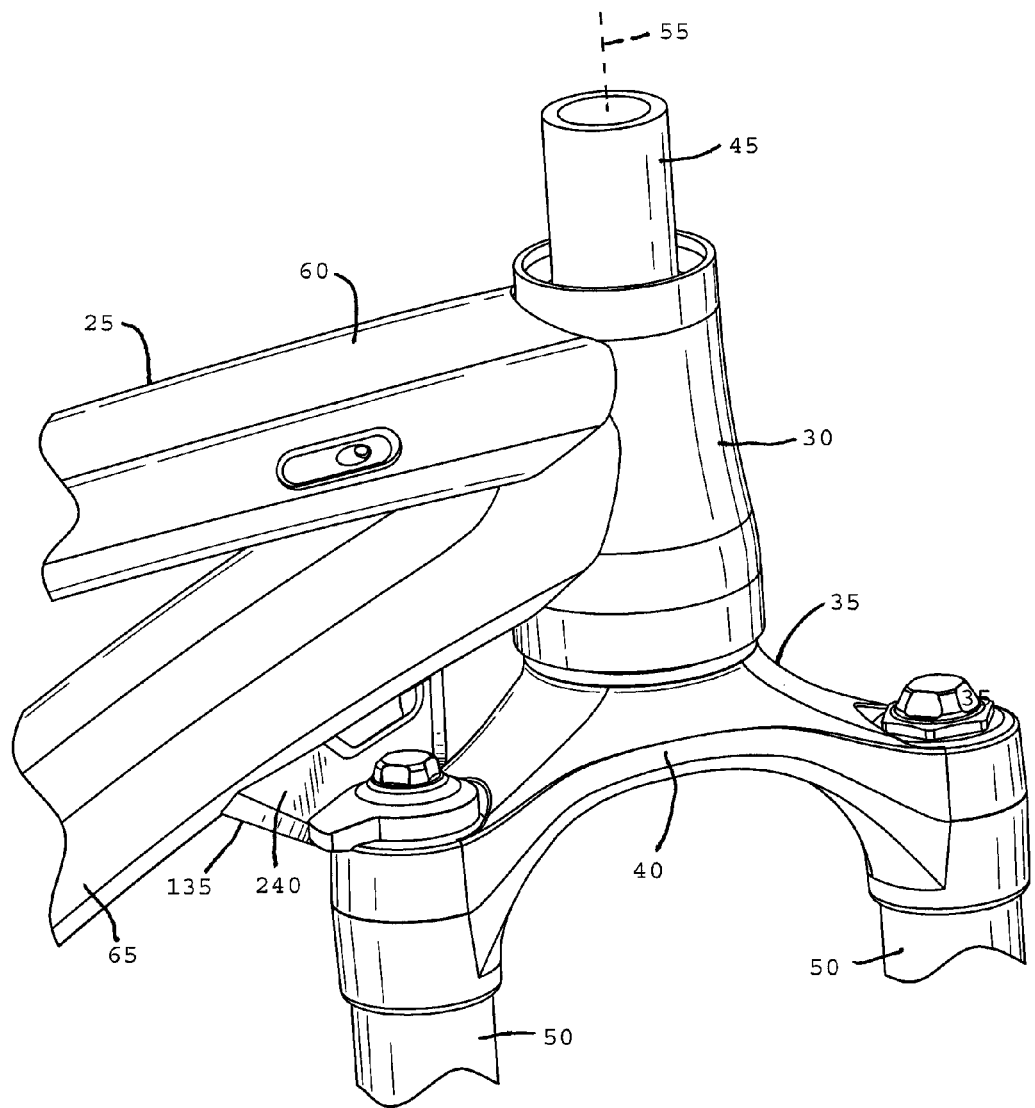
FIG. 8 is a perspective view of the frame illustrating the fork rotated to the right.
Figure 9:
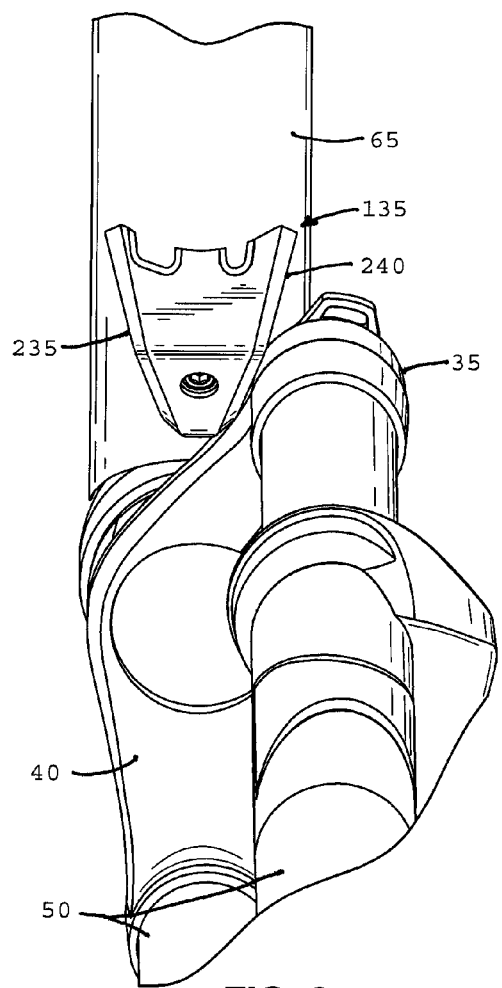
FIG. 9 is an underside view of the frame illustrating the fork rotated to the right.
Figure 10:
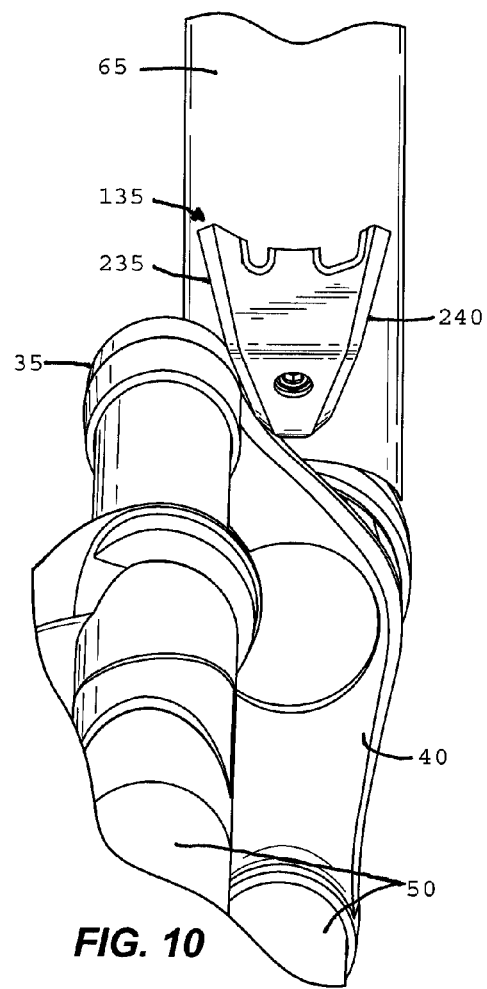
FIG. 10 is an underside view of the frame illustrating the fork rotated to the left.

FIGS. 8 and 9 illustrate the fork 35 pivoted to the right and impacting the second side wall 240 of the housing 150, whereas FIG. 10 illustrates the fork 35 pivoted to the left and impacting the first side wall 235 of the housing 150. As shown, the fork bumper 135 is attached to the down tube 65 so that when the handlebar 80 is pivoted far enough clockwise or counter-clockwise, the fork bumper 135 stops the fork 35 before the corresponding leg 50 impacts the down tube 65 and before the handlebar 80 impacts the top tube 60. As discussed above, the converging side walls 235, 240 are oriented on the fork bumper 135 so that any contact by the fork 35 on the fork bumper 135 occurs substantially perpendicular to the side walls 235, 240 to minimize sliding between the contacting surfaces of the fork 35 and the fork bumper 135. Minimizing or eliminating sliding between the contacting surfaces ensures that the fork 35 will stop upon contact with the fork bumper 135.

The resilient outer layer defined by the housing 150 softens any impact of the fork 35 on the fork bumper 135, which in turn deadens or softens any vibration transferred to the frame 25. The harder base 145 provides structural support to the fork bumper 135 and cooperates with the resilient layer 150 to stop pivotal movement of the fork 35. Also, by nesting the attachment member 140 in the base 145, the soft, resilient layer or housing 150 and the harder base 145 absorb and limit shearing forces acting on the attachment member 140 when the fork 35 hits the fork bumper 135. Also, if the fork bumper 135 is ever damaged and needs to be replaced, the existing housing 150 and/or base 145 can be removed and a new base, a new housing, or both, can be secured to the attachment member 140.

Figure 4:
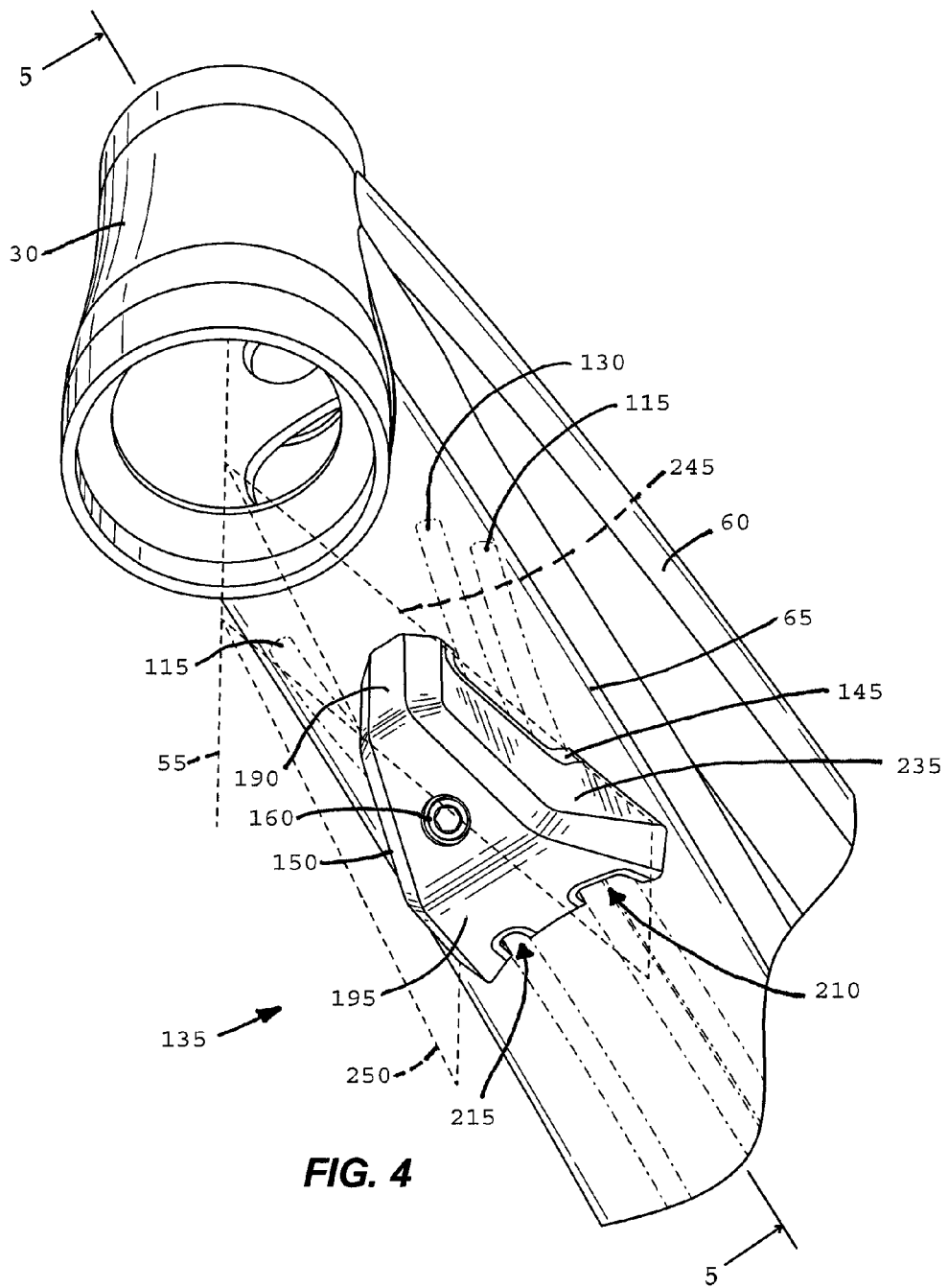
FIG. 4 is an underside view of the down tube of FIG. 2 illustrating the fork bumper.

With reference to FIGS. 2 and 4, the illustrated fork bumper 135 further provides a cable routing mechanism that reduces the need for separate cable guides on the down tube 65. Specifically, the cables 115, 130 are routed through and are held in close engagement with the down tube 65 within the passageways 210, 215. Due to the location of the passageways 210, 215, the cables 115, 130 can be routed through the fork bumper 135 before or after the fork bumper 135 is secured to the down tube 65.

Various features and advantages of the invention are set forth in the following claims.

The invention claimed is:

1. A frame for a bicycle including a fork and a handlebar, the frame comprising:
    a head tube;
    a bottom bracket adapted to support a crankset;
    a down tube coupled between the head tube and the bottom bracket; and
    a fork bumper coupled to and disposed on an underside of the down tube, the fork bumper extending outward from the down tube and including a base and a resilient outer layer engageable by the fork to prevent contact between the down tube and the fork,
    wherein the base is completely covered by the resilient outer layer.

2. The bicycle frame of claim 1, wherein the fork bumper further includes a rigid member attached to the down tube, and wherein the base and the outer layer are attached to the rigid member.

3. The bicycle frame of claim 2, wherein the rigid member is welded to the down tube.

4. The bicycle frame of claim 2, further comprising a fastener extending through the outer layer and the base and engaged with the down tube to secure the fork bumper to the down tube.

5. The bicycle frame of claim 1, wherein the outer layer is softer than the base.

6. The bicycle frame of claim 1, wherein the outer layer encapsulates the base such that the base is coupled to the down tube by the outer layer.

7. The bicycle frame of claim 1, wherein the head tube defines a fork pivot axis, wherein the fork bumper has exterior sides engageable by the fork, and wherein the fork bumper is oriented on the down tube such that respective planes defined by the exterior sides intersect substantially at the fork pivot axis.

8. A bicycle comprising:
    a frame having a head tube and a down tube coupled to the head tube; and
    a fork rotationally coupled to the head tube;
    a wheel coupled to the fork;
    a handlebar coupled to the fork to pivot the fork, the handlebar supporting an actuator coupled to one of a drivetrain and a brake by a cable; and
    a fork bumper coupled to and disposed on an underside of the down tube and engageable by the fork to prevent contact between the down tube and the fork, the fork bumper defining a passageway,
    wherein the cable extends through the fork bumper within the passageway.

9. The bicycle of claim 8, wherein the passageway is disposed along an inner side of the fork bumper adjacent the down tube such that the passageway is partially defined by the down tube.

10. The bicycle of claim 8, wherein the fork bumper has a first exterior wall and a second exterior wall converging near the head tube and a third wall between the first wall and the second wall, and wherein the passageway extends through the third wall and at least one of the first wall and the second wall.

11. The bicycle of claim 10, wherein the cable is a first cable and the passageway is a first passageway accommodating the first cable, and wherein the fork bumper defines a second passageway extending through the third wall and the other of the first wall and the second wall to accommodate a second cable.

12. The bicycle of claim 8, wherein the fork bumper includes a base and a resilient outer layer engageable by the fork.

13. A bicycle comprising:
    a frame having a head tube defining a fork pivot axis and a down tube coupled to the head tube; and
    a fork rotationally coupled to the head tube and including a crown, a leg extending downward from the crown, and a steerer tube extending upward from the crown and through the head tube;
    a wheel coupled to the leg;
    a handlebar coupled to the steerer tube to pivot the fork about the fork pivot axis; and
    a fork bumper coupled to and disposed on an underside of the down tube to prevent contact between the down tube and the fork, the fork bumper having a first side engageable by the fork in response to the fork pivoting in a first direction and a second side engageable by the fork in response to the fork pivoting in a second direction different from the first direction, the fork bumper oriented on the down tube such that the first and second sides converge toward each other adjacent the head tube, the fork bumper including an anchor attached only to the underside of the down tube.

14. The bicycle of claim 13, wherein respective planes defined by the first side and the second side intersect substantially at the fork pivot axis.

15. The bicycle of claim 13, wherein the fork bumper has a first wall defining the first side, a second wall defining the second side, and a third wall extending between the first and second walls, and wherein the fork bumper defines a passageway extending through the second wall and at least one of the first wall and the second wall to route a cable from the handlebar to another location on the bicycle.

16. The bicycle of claim 15, wherein the passageway is a first passageway extending through the third wall and one of the first and second walls to accommodate the cable, and wherein the fork bumper defines a second passageway extending through the third wall and the other of the first wall and the second wall to accommodate another cable.

17. The bicycle of claim 13, wherein the fork bumper includes a base and an outer layer substantially encapsulating the base.

18. The bicycle of claim 17, wherein the fork bumper further includes a rigid member attached to the down tube, and wherein the base and the outer layer are attached to the rigid member by a fastener.

19. The bicycle of claim 17, wherein the outer layer is softer than the base.

20. The bicycle of claim 13, wherein the fork bumper is removably coupled to the down tube.

* * * * *